(12) United States Patent
Noggle

(10) Patent No.: US 6,604,894 B1
(45) Date of Patent: Aug. 12, 2003

(54) ROTATABLE CUTTING TOOL

(75) Inventor: Kenneth G. Noggle, West Bloomfield, MI (US)

(73) Assignee: Valenite Inc., Madison Hts., MI (US)

( * ) Notice: Subject to any disclaimer, the term of this patent is extended or adjusted under 35 U.S.C. 154(b) by 0 days.

(21) Appl. No.: 10/093,211

(22) Filed: Mar. 8, 2002

(51) Int. Cl.$^7$ .............................. B23C 5/20; B26D 1/00
(52) U.S. Cl. .......................................... 407/35; 407/43
(58) Field of Search .................... 407/35, 43, 110, 407/50

(56) References Cited

U.S. PATENT DOCUMENTS

| | | | |
|---|---|---|---|
| 3,546,761 A | * 12/1970 | Gage | 407/35 |
| 3,588,977 A | 6/1971 | Bellingham et al. | |
| 4,292,866 A | * 10/1981 | Kaczynski | 82/158 |
| 4,302,135 A | * 11/1981 | Lillie | 408/59 |
| 4,934,880 A | 6/1990 | Stashko | |
| 4,993,890 A | * 2/1991 | Tukala et al. | 407/34 |
| 5,059,068 A | 10/1991 | Scott | |
| 5,102,269 A | 4/1992 | Aral et al. | |
| 5,201,621 A | * 4/1993 | McMurtry et al. | 409/233 |
| 5,267,817 A | 12/1993 | Englund | |
| 5,662,436 A | 9/1997 | Bishop | |
| 5,800,079 A | * 9/1998 | Qvarth | 407/46 |
| 6,116,823 A | 9/2000 | Mihic | |
| 6,120,218 A | 9/2000 | Bishop | |
| 6,325,574 B1 | * 12/2001 | Treige | 407/35 |

* cited by examiner

Primary Examiner—A. L. Wellington
Assistant Examiner—Dana Ross
(74) Attorney, Agent, or Firm—Burns, Doane, Swecker & Mathis, LLP

(57) ABSTRACT

A rotatable cutting tool has a shank portion for coupling to a tool driving device and a cutting portion in which are retained plural replaceable cutting inserts, each insert having at least one cutting edge. The shank portion includes a mounting face for removeably supporting an insert mounting disk having plural recesses at the periphery thereof for receiving the replaceable inserts. Each recess provides at least one seating surface for an insert, and includes opposing face portions between which an insert is releasably retained. The disk includes a central bore and radial grooves, at least one radial groove connecting the central bore and each insert receiving recess. The disk includes a concave central portion surrounding the central bore. A clamping means secures the disk to the shank and is used to elastically deform the concavity of the disk, whereby clamping forces are built and relaxed on all inserts placed in the disk concurrently by adjustment of the clamping means.

21 Claims, 3 Drawing Sheets

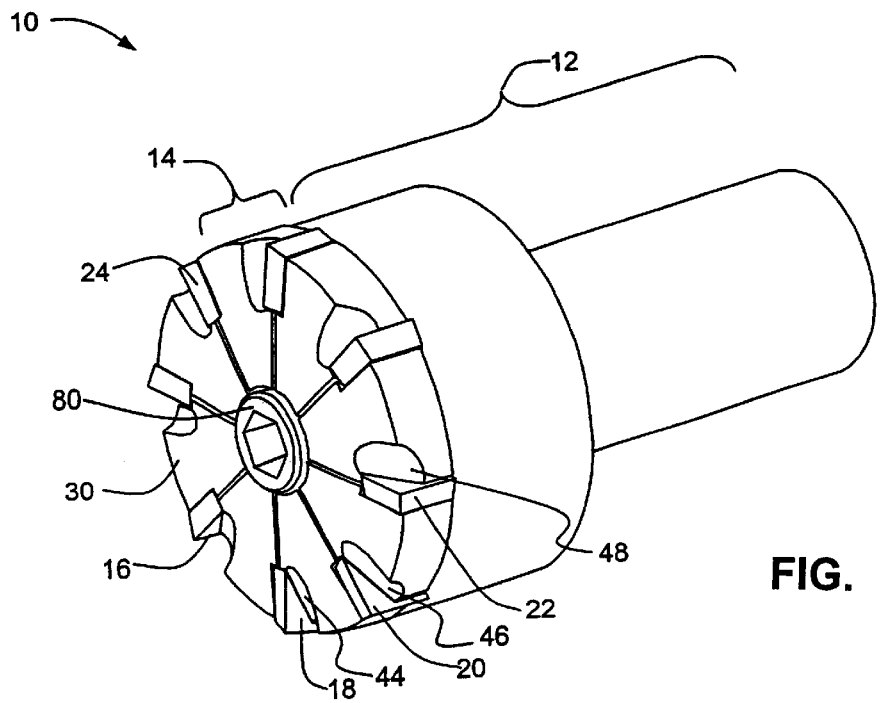
FIG. 1
FIG. 2
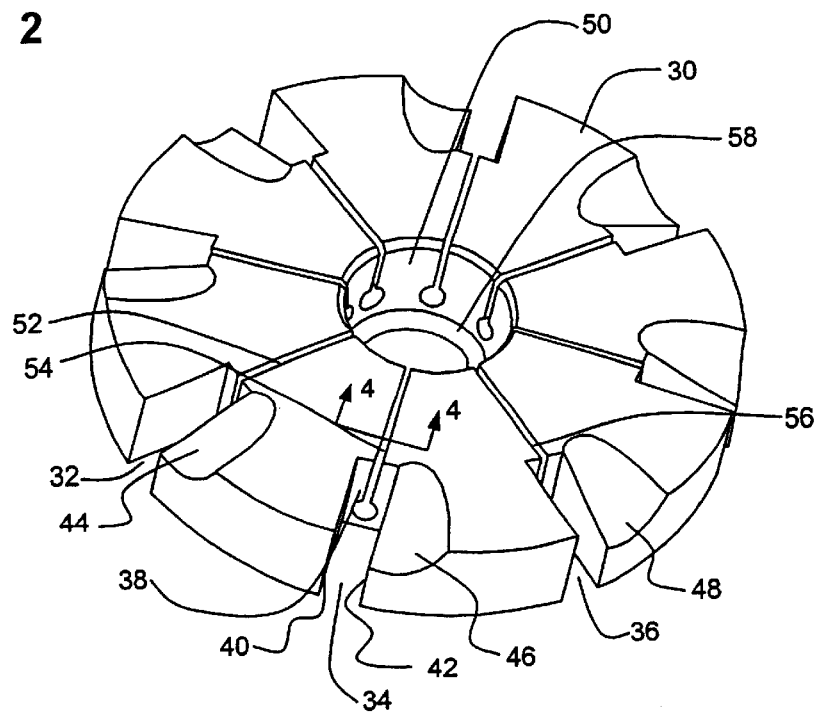

ROTATABLE CUTTING TOOL

BACKGROUND OF THE INVENTION

I. Field of the Invention

This invention relates to cutting tools and particularly to rotatable cutting tools of the having a tool body with recesses for receiving replaceable inserts with cutting edges. More particularly, this invention relates to improved insert retaining means for milling cutters wherein inserts are releasably mounted to the periphery of a tool body.

II. Description of Related Art

Known milling cutters comprising replaceable inserts use various means for mounting the inserts to the tool body. Examples of milling cutters wherein inserts are mounted to the tool body using screws are illustrated in U.S. Pat. No. 4,934,880. Examples of milling cutters wherein inserts are held to the tool body by releasable clamps are illustrated in U.S. Pat. No. 3,588,977. While such known tools provide secure mounting of replaceable inserts to the tool body, use of individual screws or clamps for each replaceable insert has the inherent disadvantage of requiring independent release and adjustment of each insert mounting device for each insert to be replaced. Hence, there is a need for improved mounting means for such tools that simplify release and remounting of replaceable inserts.

A cutting tool with an insert retaining means wherein all inserts are released and retained by a single tool element is illustrated in U.S. Pat. No. 5,662,436. In this tool, a star shaped holding member is mounted to a base having seats for plural replaceable inserts. The radial protrusions of the holding member are shaped to interfit in gaps between the replaceable inserts and abutments of the base. With inserts supported on pins on the base member, the holding member is distorted by a clamping nut to cause the radial protrusions to fill the gaps, thereby securing the inserts in place on the base member. As illustrated by FIG. 9 of U.S. Pat. No. 5,662,436, release and removal of inserts from the base member requires separation of the base and the holding member. Hence, there is a continuing need to further improve tools to simplify release and remounting of replaceable inserts.

SUMMARY OF THE INVENTION

It is an object of the present invention to provide a rotatable cutting tool wherein plural replaceable inserts are retained in a cutting portion thereof, each replaceable insert providing at least one cutting edge, the cutting tool comprising insert clamping means for retaining an insert in each recess and operative concurrently for all inserts using a single adjusting means.

It is a further object of the present invention to provide a rotatable cutting tool comprising an insert mounting disk having at the periphery thereof plural insert receiving recesses, the insert mounting disk being removeably mounted to a shank portion of the cutting tool, and insert clamping means for releasably retaining a replaceable insert in each recess by exerting a compressive force transverse to each insert, the compressive force for all inserts being established concurrently by a single clamp adjusting means.

It is a still further object of the present invention to provide a rotatable cutting tool comprising an insert mounting disk removeably mounted to a shank portion of the tool, the mounting disk having plural peripheral insert receiving recesses, a central bore, at least one radial groove connecting the central bore and each recess and having a concave central portion surrounding the central bore, the tool comprising clamping means comprising a clamping screw for elastically deforming the concavity of the disk against a face of the tool shank portion whereby opposing portions of each recess exert compressive forces on an insert therebetween.

Further objects and advantages of the invention shall be made apparent from the accompanying drawings and the following description thereof.

In accordance with the aforesaid objects the present invention provides a rotatable cutting tool having a shank portion for mounting to a tool driving device and a cutting portion in which are retained plural replaceable cutting inserts, each insert having at least one cutting edge. The shank portion includes a mounting face for receiving a cutting portion of the tool. The cutting portion comprises an insert mounting disk having plural recesses at the periphery thereof for receiving the replaceable inserts. Each recess provides at least one seating surface for an insert, and includes opposing face portions between which an insert is releasably retained. The disk includes a central bore and plural radial grooves open to a first side of the disk, at least one radial groove connecting the central bore and each insert receiving recess. A concave central portion surrounds the central bore on a second side of the disk. The disk is mounted to the cutting tool shank with an adjusting means having a shaft portion passing through the central bore of the disk. The adjusting means is used to elastically deform the concavity of the disk. With replaceable inserts in place, elastic deformation of the disk to flatten the concavity concurrently builds insert retaining compressive forces by opposing faces of each insert receiving recess; relaxation of the deformation to restore the concavity concurrently relieves the retaining forces exerted by the opposing faces of each insert receiving recess, permitting release of the inserts.

BRIEF DESCRIPTION OF THE DRAWINGS

FIG. 1 is a three dimensional view of a cutting tool in accordance with the invention.

FIG. 2 is a three dimensional view showing the top of an insert mounting disk of the tool of FIG. 1

DETAILED DESCRIPTION OF THE PREFERRED EMBODIMENT

Figure 3:
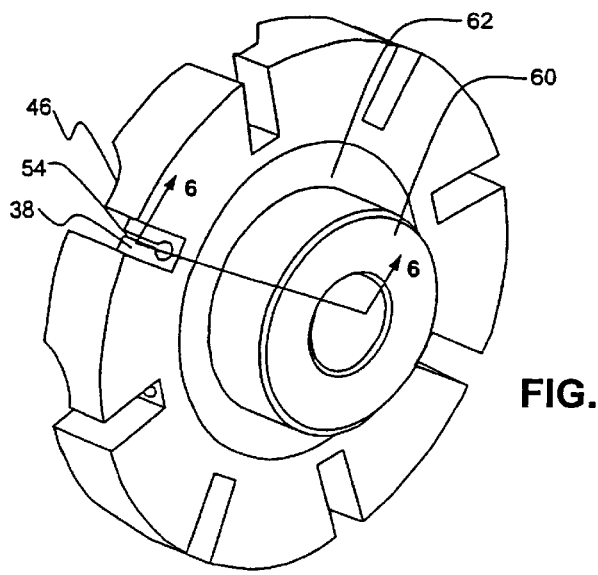
FIG. 3 is a three dimensional view of the bottom of the disk of FIG. 2

The invention shall be described with reference to a preferred embodiment illustrated in the accompanying figures. While the preferred embodiment illustrates features of the invention, it is not the intention of applicants that the invention be limited to particular details of the preferred embodiment.

A rotatable cutting tool 10 depicted in FIG. 1 includes a shank portion 12 and a cutting portion 14. As seen in FIG.

5, shank portion 12 has a mounting face 70 and a shank end 72. Shank end 72 may include any form of known coupling device for mounting to a tool driving means for rotation of cutting tool 10. Cutting portion 14 is provided with replaceable inserts, such as inserts 16–24, each replaceable insert having at least one cutting edge exposed for machining a workpiece by rotation of cutting tool 10. As shown in FIG. 1, the replaceable inserts have substantially square front and rear surfaces, the rear surface of each insert seated against a side of an insert receiving recess. The front and rear surfaces of each replaceable insert are joined by side surfaces, at least a portion of the intersection of the side surfaces and the front and/or rear surfaces defining cutting edges. While the arrangement of FIG. 1 provides a so-called "on edge" mounting configuration, i.e., at least one insert side surface exposed, the invention is also suitable for retaining inserts in a so-called "lay down" mounting configuration, i.e. with an insert front or rear surface exposed. The inserts depicted in FIG. 1 have cutting edges in at least two sides of the front surface, and the side surfaces slope inwardly from the periphery of the front surface toward the rear surface.

Replaceable inserts useable in the invention may be made of hard materials, such as high speed steel, cemented tungsten carbide, ceramic materials, and the like, as are well known. The replaceable inserts are advantageously made to include particular geometric features to enhance cutting performance in particular applications, including relief surfaces, chipbreaking features, chip controlling grooves and the like, all as are well known. Further, the inserts may be formed to effect particular orientations of the cutting edges relative to the cutting tool axis of rotation as the inserts are mounted to the tool body, as is well known. Replaceable inserts usable in the present invention may be of a wide variety of shapes and sizes chosen for the particular type of machining to be performed all as are well known.

Referring to FIGS. 1 and 2, cutting portion 14 comprises insert mounting disk 30 removeably mounted to shank portion 12 by clamping screw 80 threadably engaged with shank portion 12. Insert receiving recesses, such as peripheral recesses 32–36 (FIG. 2) are formed in the periphery of disk 30. Disk 30 further comprises chip relief recesses, such as recesses 44–48, each chip relief recess being adjacent an insert receiving recess. Each insert receiving recess provides at least one seating surface for an insert, such as surface 38 (FIG. 2). Each insert receiving recess further comprises opposing face portions, such as faces 40 and 42 (FIG. 2) which may include additional or alternative seating surface portions (not shown). The seating surfaces may be ground to tolerances sufficient to insure acceptable tolerances of the location of cutting edges of inserts retained in disk 30. Alternatively, disk 30 may include insert location adjusting means such as adjustable screws and/or combinations of screws, shims, and the like, all as are well known, on surfaces of the insert receiving recesses chosen for precise setting of cutting edge location relative to disk 30.

Figure 4:
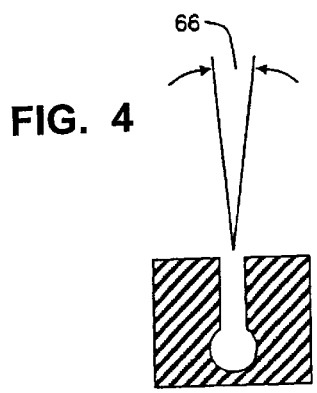
FIG. 4 is a partial cross section of the disk taken along the line 4—4 of FIG. 2.
Figure 6:
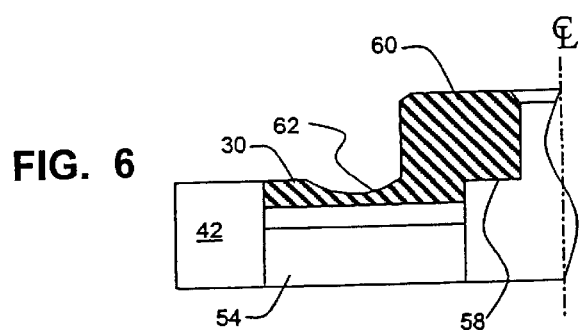
FIG. 6 is a partial cross section of the disk taken along the line 6—6 of FIG. 3.

Continuing with reference to FIGS. 2, 3 and 4, central bore 50 of disk 30 allows passage through disk 30 of clamping screw 80 (FIG. 1). Central bore 50 has an enlarged diameter at the top surface of disk 30 to provide clearance for the head of clamping screw 80, and a shoulder 58 (FIGS. 2 and 6) therebelow to engage the bottom surface of the head of clamping screw 80. Radial grooves, such as grooves 52–56 connect central bore 50 with the insert receiving recesses, at least one radial groove being provided for each insert receiving recess. As seen in FIG. 2, the radial grooves and insert receiving recesses divide the top surface of disk 30 into segments, the segments being separated by the width of the connecting grooves at the top surface of disk 30. Advantageously, the bottom of each radial groove is cylindrical (FIG. 4), the diameter of the cylinder being larger than the width of the groove to reduce strain in disk 30 at the bottoms of the grooves during deformation.

Figure 5:
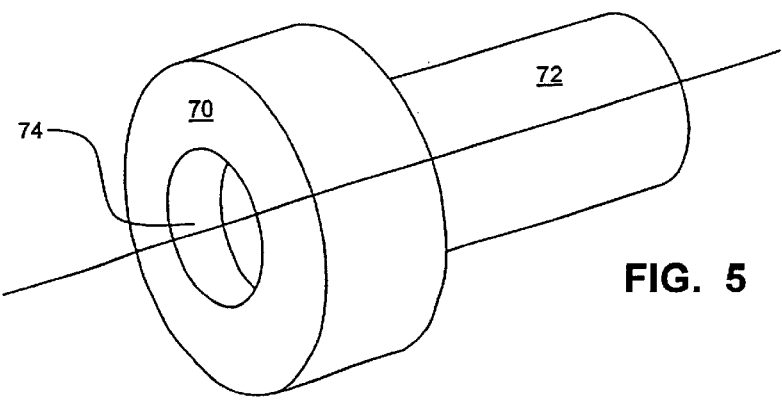
FIG. 5 is a three dimensional view of the shank portion of the cutting tool of FIG. 1.

The bottom surface of disk 30 includes a central hub 60 (FIG. 3) surrounding central bore 50. Hub 60 is received within mating bore 74 (FIG. 5) of shank portion 12. Hub 60 and mating bore 74 provide interfitting engagement of disk 30 when assembled to shank portion 12 to resist lateral displacement of disk 30 across face 70. Interfitting engagement of disk 30 and shank portion 12 could as well be achieved by a projecting hub on shank portion 12 and a mating recess in disk 30. Equivalently, any combination of interfitting projections and recesses could be provided on disk 30 and shank portion 12 so long as the placement thereof allows the desired deformation of disk 30 while resisting its lateral displacement relative to shank portion 12.

Continuing with reference to FIGS. 1, 3, 5 and 6, surrounding hub 60, the bottom surface of disk 30 has an annular concave region 62. Concave region 62 extends radially from hub 60 beyond the widest reach of the central bore at the top surface of disk 30, insuring the concave region co-extends with at least a portion of each radial groove. With hub 60 seated in mating bore 74, concave region 62 defines a void between face 70 (FIG. 5) of shank portion 12 and the bottom surface of disk 30. Advance of clamping screw 80 into shank portion 12 deforms disk 30 by flattening concave region 62 against face 70. As concave region 62 flattens, the widths of connecting grooves in the upper surface of disk 30 are reduced by bending of the segments in the upper surface relative to the cylindrical bottoms of the connecting grooves. The bending altering angle 66 (FIG. 4) and altering the gaps of the connecting groove widths. The narrowing of widths of connecting grooves is accompanied by narrowing of the gap between opposing faces, such as faces 40 and 42, of the insert receiving recesses. With inserts seated in the insert receiving recesses, the opposing faces of each insert receiving recess build compressive forces concurrently on all inserts as concave region 62 is flattened. In this manner, the inserts are retained in the recesses by forces sufficient to prevent dislodging the inserts from disk 30 by cutting forces acting on the inserts in use. Replacement of inserts is greatly simplified in that the retaining forces are relieved concurrently on all inserts by relaxation of disk 30 as clamping screw 80 is retracted from shank portion 12. Sufficient relief of these forces is accomplished without dismounting disk 30 from shank portion 12, allowing the replacement of the inserts while disk 30 remains assembled to shank portion 12.

While the arrangement illustrated in the figures provides a clamping screw, equivalently, deformation of disk 30 could as well be effected by the combination of a threaded stud projecting from shank potion 12 and a clamping nut. Advance of the clamping nut toward shank portion 12 effecting flattening of concave region 62 against face 70 in the manner described. It will be further appreciated by those skilled in the art, that the clamping forces applied by such a nut or screw may be applied over a larger surface area of disk 30 by use of washers or other force distributing members between the bottom of the screw head, or nut, as the case may be, and the engaging surface of disk 30. Further, while the arrangement illustrated in the figures contemplates flattening of concave region 62 against face 70, equivalently the desired elastic deformation of disk 30 could be achieved were the locations of the concave region and the connecting grooves reversed relative to shank portion 12 and a clamping force were applied through an overlying plate to act on the concave region on the exposed side of the disk.

Figure 7:
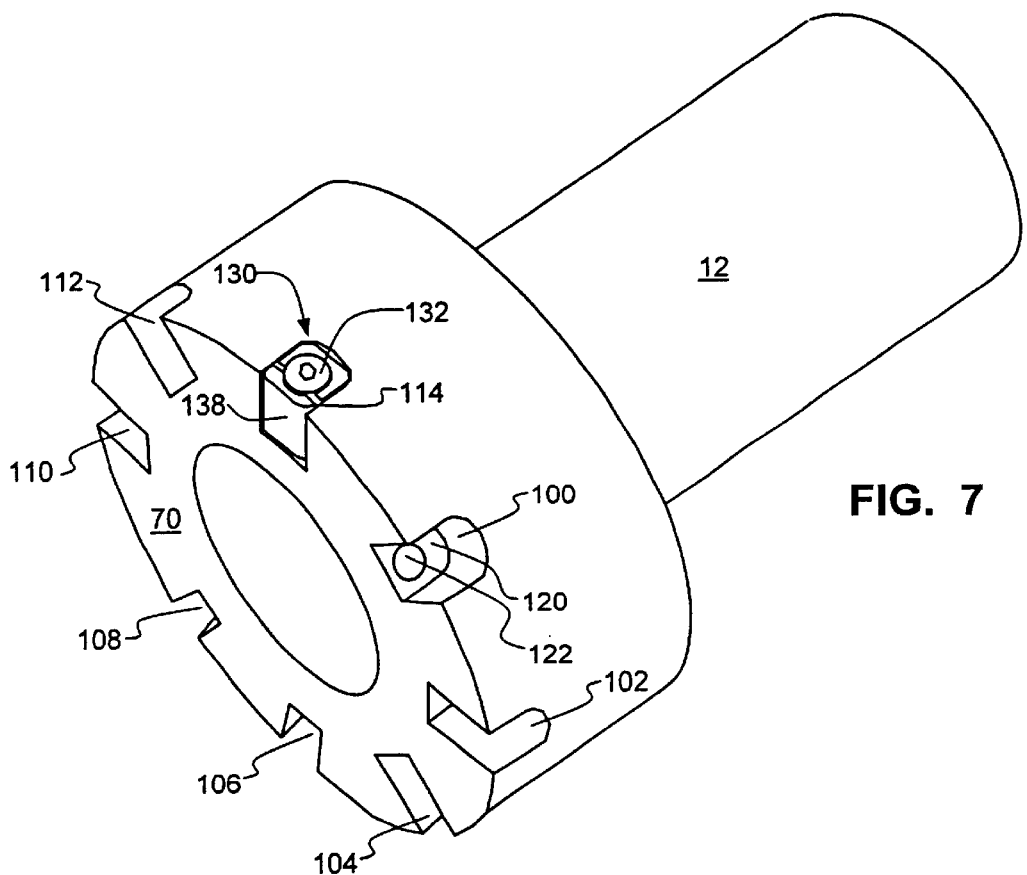
FIG. 7 is a three dimensional view of a shank portion with position adjusting devices.
Figure 8:
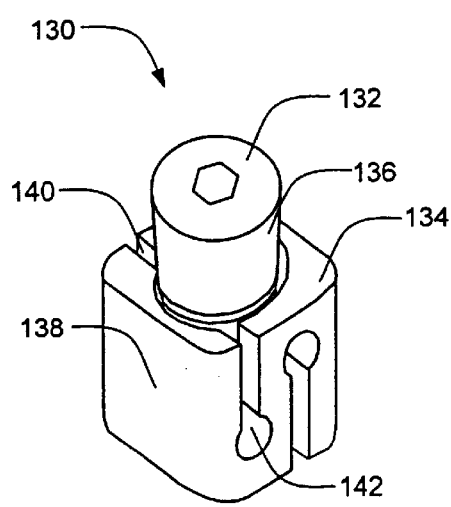
FIG. 8 is a three dimensional view of a position adjusting device of FIG. 7.

Referring to FIG. 7, shank portion 12 is shown fitted to provide adjustment of the axial position of replaceable inserts of disk 30. Recesses 100–114 in shank portion 12 are open at face 70 and provide seating surfaces interiorly of face 70 for an adjusting device. Each recess has a floor, such as floor 120 of recess 100, and a threaded hole, such as hole 122 open to floor 120. An adjusting device, such as adjusting device 130, is fitted in each of recesses 100–114, and is retained in shank portion 12 by an adjusting screw, such as screw 132. Each adjusting device comprises an elastically deformable member, such as split sleeve 134 (FIG. 8) with a through hole to receive adjusting screw 132. Each split sleeve comprises an elastically deformable element, such as leaf 138, partially separated from sleeve 134 by, for example, slots, such as slots 140 and 142 (FIG. 8). Slots 140 and 142 run through opposing sides of sleeve 134 and are open to the through hole.

Continuing with reference to FIG. 8, leaf 138 may be elastically bent relative to the enlarged lower ends of slots 140 and 142 (enlarged lower end of slot 142 shown in FIG. 8) by application of a force on the inside surface of leaf 138 above the enlarged lower ends of slots 140 and 142. Adjusting screw 132 includes a tapered head 136 and a threaded portion (not shown) for engagement with, for example, threaded hole 122. The large end of head 136 has a diameter greater than the largest internal diameter of the through hole of split sleeve 134.

Referring to FIG. 7, split sleeve 134 is retained in recess 100 to expose leaf 138 at the opening in face 70 of recess 100. As adjusting screw 132 is advanced into threaded hole 122, head 136 elastically bends leaf 138 away from screw 132. Leaf 138 serves as an axial seating surface for an insert retained in disk 30. With disk 30 fitted to shank portion 12, expansion or relaxation of the split sleeves by the adjusting screws determines the position of the axial seating surface of inserts in disk 30, whereby setting of the adjusting screws determines position of cutting edges of the replaceable inserts along the length of tool 10.

While the invention has been described with reference to a preferred embodiment, and the preferred embodiment has been described in considerable detail, it is not the intention of the applicants that the invention be defined by the preferred embodiment. Rather, it is the intention of the applicants that the invention be defined by the appended claims and all equivalents thereto.

What is claimed is:

1. A rotatable cutting tool having a shank portion and a cutting portion defining an axis of rotation, the cutting portion comprising an insert mounting disk having a plurality of peripheral recesses to receive replaceable cutting inserts, each recess comprising at least one seating surface for a cutting insert and circumferentially opposing faces, each of the opposing faces constituting an integral part of the disk and extending completely through the disk from a first axially facing side thereof to a second axially facing side thereof, the insert mounting disk having a central bore and, in a first side thereof, a plurality of radial grooves, at least one radial groove connecting each peripheral recess with the central bore, and, in a second side thereof, a concave portion formed in the second side and surrounding the central bore, the disk being removeably mounted to the shank portion by a clamping means for deforming the disk by flattening the concave region, deformation of the disk narrowing the gap between the opposing faces of each peripheral recess, gaps of all said peripheral recesses being concurrently narrowed, whereby inserts are releasably retained by forces exerted thereon by the opposing faces.

2. The rotatable cutting tool of claim 1 wherein one of the insert mounting disk and shank portion includes at least one projection, and the other of the insert mounting disk and shank portion includes a mating recess, the projection and mating recess interfitting when the insert mounting disk is assembled to the shank portion to prevent lateral displacement of the insert mounting disk relative to the shank portion while permitting deformation of the insert mounting disk for releasable retention of inserts therein.

3. The rotatable cutting tool of claim 2 wherein the insert mounting disk further comprises a projecting hub surrounding the central bore, the shank portion comprises a mating recess for interfitting engagement with the hub, the concave region surrounds the projecting hub and the concave regions is flattened against the mounting face of the shank portion by application of a clamping force to the insert mounting disk.

4. The rotatable cutting tool of claim 1 wherein the insert mounting disk is mounted to the shank portion with the concave region facing a face surface of the shank portion and the clamping means is adjustable for elastically flattening the concave region against the face surface of the shank portion.

5. The rotatable cutting tool of claim 4 wherein the clamping means further comprises a screw threadably engaged with the shank portion and engaging a surface of the insert mounting disk so that adjustment of the screw elastically flattens the concave region.

6. The rotatable cutting tool of claim 4 wherein the clamping means further comprises a threaded stud projecting from the shank portion and a nut threadably engaged with the stud and engaging a surface of the insert mounting disk so that adjustment of the nut elastically flattens the concave region.

7. The rotatable cutting tool of claim 1 wherein the insert mounting disk is mounted to the shank portion with the concave region facing away from the shank portion and the cutting tool further comprises a plate overlying the concave region and the clamping means is adjustable for elastically flattening the concave region against the overlying plate.

8. The rotatable cutting tool of claim 7 wherein the clamping means further comprises a screw threadably engaged with the shank portion and engaging a surface of the insert mounting disk so that adjustment of the screw elastically flattens the concave region.

9. The rotatable cutting tool of claim 7 wherein the clamping means further comprises a threaded stud projecting from the shank portion and a nut threadably engaged with the stud and engaging a surface of the insert mounting disk so that adjustment of the nut elastically flattens the concave region.

10. The rotatable cutting tool of claim 1 wherein each peripheral recess is configured to retain a replaceable insert to expose at least one side surface and at least one cutting edge.

11. The rotatable cutting tool of claim 10 wherein each peripheral recess is configured to retain a replaceable insert to expose two or more cutting edges.

12. The rotatable cutting tool of claim 10 further comprising adjusting devices for determining location along the length of the cutting tool of cutting edges of replaceable inserts retained in the insert mounting disk.

13. The rotatable cutting tool of claim 1 wherein the mounting disk further comprises chip relief recesses, at least one chip relief recess adjacent each insert receiving recess.

14. An insert mounting disk for a rotatable cutting tool, the insert mounting disk having a plurality of peripheral recesses to receive replaceable cutting inserts, each recess comprising at least one seating surface for a cutting insert and circumferentially opposing faces, each of the opposing faces constituting an integral part of the disk and extending completely through the disk from a first axially facing side thereof to a second axially facing side thereof, the insert mounting disk having a central bore and, in a first side thereof, a plurality of radial grooves, at least one radial groove connecting each peripheral recess with the central bore, and, in a second side thereof, a concave portion formed in the second side and surrounding the central bore, the concave portion permitting elastic deformation of the disk relative the radial grooves to narrow the gap between opposing faces of each peripheral recess, said gaps being concurrently narrowed for all peripheral recesses by such deformation.

15. The insert mounting disk of claim 14 wherein insert mounting disk includes at least one of a projection and recess for engagement with one of a mating projection and recess of a cutting tool shank portion, the engagement of the mating projection and recess preventing lateral displacement of the insert mounting disk relative to the shank portion while permitting deformation of the insert mounting disk for releasable retention of inserts therein.

16. The insert mounting disk of claim 15 further comprising one or more of projections and recesses for engagement with one or more mating projections and recesses of a cutting tool shank portion.

17. The insert mounting disk of claim 14 wherein each peripheral recess is configured to retain a replaceable insert to expose at least one side surface and at least one cutting edge.

18. The insert mounting disk of claim 15 wherein each peripheral recess is configured to retain a replaceable insert to expose two or more cutting edges.

19. The insert mounting disk of claim 16 further comprising insert location adjusting means associated with at least one surface of each insert receiving recess for precise setting of cutting edge location relative to the insert mounting disk.

20. The insert mounting disk of claim 14 further comprising chip relief recesses, at least one chip relief recess adjacent each insert receiving recess.

21. A rotatable cutting tool having a shank portion and a cutting portion, the cutting portion comprising an insert mounting disk having a plurality of peripheral recesses to receive replaceable cutting inserts, each recess comprising at least one seating surface for a cutting insert and opposing faces, the insert mounting disk having a central bore and, in a first side thereof, a plurality of radial grooves, at least one radial groove connecting each peripheral recess with the central bore, and, in a second side thereof, a concave portion surrounding the central bore, the disk being removeably mounted to the shank portion by a clamping means for deforming the disk by flattening the concave region, deformation of the disk narrowing the gap between the opposing faces of each peripheral recess, gaps of all said peripheral recesses being concurrently narrowed, whereby inserts are releasably retained by forces exerted thereon by the opposing faces, wherein one of the insert mounting disk and shank portion includes at least one projection, and the other of the insert mounting disk and shank portion includes a mating recess, the projection and mating recess interfitting when the insert mounting disk is assembled to the shank portion to prevent lateral displacement of the insert mounting disk relative to the shank portion while permitting deformation of the insert mounting disk for releasable retention of inserts therein, wherein the insert mounting disk further comprises a projecting hub surrounding the central bore, the shank portion comprises a mating recess for interfitting engagement with the hub, the concave region surrounds the projecting hub and the concave region is flattened against the mounting face of the shank portion by application of a clamping force to the insert mounting disk.

\* \* \* \* \*